United States Patent
Hayashi

(10) Patent No.: US 10,351,721 B2
(45) Date of Patent: Jul. 16, 2019

(54) AQUEOUS INKJET INK AND METHOD FOR MANUFACTURING PRINTED ARTICLE

(71) Applicant: RISO KAGAKU CORPORATION, Tokyo (JP)

(72) Inventor: Akiko Hayashi, Ibaraki (JP)

(73) Assignee: RISO KAGAKU CORPORATION, Tokyo (JP)

( * ) Notice: Subject to any disclaimer, the term of this patent is extended or adjusted under 35 U.S.C. 154(b) by 15 days.

(21) Appl. No.: 15/824,724

(22) Filed: Nov. 28, 2017

(65) Prior Publication Data

US 2018/0148589 A1 May 31, 2018

(30) Foreign Application Priority Data

Nov. 30, 2016 (JP) .................. 2016-232414

(51) Int. Cl.
*C09D 11/328* (2014.01)
*C09D 11/322* (2014.01)
*C09D 11/38* (2014.01)

(52) U.S. Cl.
CPC .......... *C09D 11/322* (2013.01); *C09D 11/328* (2013.01); *C09D 11/38* (2013.01)

(58) Field of Classification Search
CPC .............................................. C09D 11/30–40
See application file for complete search history.

(56) References Cited

U.S. PATENT DOCUMENTS

| 2005/0172855 A1 | 8/2005 | Iijima et al. | |
| 2010/0076150 A1* | 3/2010 | Ikoshi | C09D 11/322 524/555 |
| 2011/0007110 A1* | 1/2011 | Shimizu | C09D 11/328 347/20 |
| 2015/0284577 A1* | 10/2015 | Kondo | C09D 11/38 347/20 |
| 2017/0342288 A1* | 11/2017 | Kitade | B41J 2/01 |

FOREIGN PATENT DOCUMENTS

| JP | 2005-220296 A | 8/2005 | |
| JP | 2010-70669 A | 4/2010 | |
| JP | 2015-67678 A | 4/2015 | |
| WO | WO-2016098603 A1 * | 6/2016 | ................ B41J 2/01 |

* cited by examiner

*Primary Examiner* — Veronica F Faison
(74) *Attorney, Agent, or Firm* — Hamre, Schulmann, Mueller & Larson, P.C.

(57) ABSTRACT

An aqueous inkjet ink is disclosed which contains water, a polyoxyethylene polyglyceryl ether and a colorant, wherein a ratio (B/A) of the total number (B) of hydroxyl groups within a molecule of the polyoxyethylene polyglyceryl ether relative to the weight average molecular weight (A) of the polyoxyethylene polyglyceryl ether is within a range from 0.002 to 0.012.

14 Claims, No Drawings

AQUEOUS INKJET INK AND METHOD FOR MANUFACTURING PRINTED ARTICLE

CROSS REFERENCE TO RELATED APPLICATIONS

This application is based upon and claims the benefit of priority from the prior Japanese Patent Application No. 2016-232414, filed on Nov. 30, 2016, the entire contents of which are incorporated by reference herein.

BACKGROUND OF THE INVENTION

Field of the Invention

Embodiments of the present invention relate to an aqueous inkjet ink and a method for producing a printed item.

Description of the Related Art

Inkjet inks used in inkjet recording methods are broadly classified into aqueous inks and non-aqueous inks. Aqueous inks contain water as a solvent, and therefore particularly in those cases where plain paper is used as the recording medium, the solvent tends to penetrate readily into the recording medium, while the colorant can be easily retained at the surface of the recording medium, meaning high-density, high-quality printed images can be easily obtained. On the other hand, paper deformation such as curling and cockling may sometimes occur due to absorption of the water in the ink by the recording medium, and this type of deformation can have an effect on the transport properties of the recording medium.

With respect to inkjet inks, JP 2005-220296 A, JP 2015-67678 A and JP 2010-70669 A propose technology for suppressing paper deformation.

In terms of inkjet recording methods, in recent years there have been growing demands for methods that enable printing to be performed at high speeds. In light of these demands, line inkjet printers using a line head system are becoming increasingly popular as inkjet printers capable of high-speed printing.

SUMMARY OF THE INVENTION

According to an aspect of the present invention, an aqueous inkjet ink is provided which contains water, a polyoxyethylene polyglyceryl ether and a colorant, wherein a ratio (B/A) of the total number (B) of hydroxyl groups within a molecule of the polyoxyethylene polyglyceryl ether relative to the weight average molecular weight (A) of the polyoxyethylene polyglyceryl ether is within a range from 0.002 to 0.012.

According to another aspect of the present invention, a method for producing a printed item is provided, the method including applying the above aqueous inkjet ink to a recording medium using an inkjet recording method.

DETAILED DESCRIPTION OF THE EMBODIMENTS

Embodiments of the present invention are described below, but the present invention is in no way limited by the following embodiments.

When an aqueous ink is used in high-speed printing, because the paper is transported within a short time period, problems caused by paper deformation, such as paper blockages, tend to occur more frequently.

An object of an embodiment of the present invention is to provide an aqueous inkjet ink that can reduce paper deformation.

The aqueous inkjet ink (hereafter sometimes referred to as simply "the ink") according to an embodiment of the present invention contains water, a polyoxyethylene polyglyceryl ether and a colorant, wherein a ratio (B/A) of the total number (B) of hydroxyl groups within a molecule of the polyoxyethylene polyglyceryl ether relative to the weight average molecular weight (A) of the polyoxyethylene polyglyceryl ether is within a range from 0.002 to 0.012.

By including the polyoxyethylene polyglyceryl ether having a ratio (B/A) of the total number (B) of hydroxyl groups within the molecule relative to the weight average molecular weight (A) of 0.002 to 0.012 (hereafter also referred to as "the polyoxyethylene polyglyceryl ether P") as a water-soluble organic solvent, paper deformation may be reduced.

The polyoxyethylene polyglyceryl ether has a structure in which ethylene oxide is added to a polyglycerol with a structure in which a plurality of glycerol molecules are polymerized. A typical polyoxyethylene polyglyceryl ether can be represented by general formula P1 shown below.

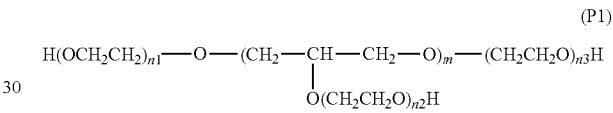

In general formula P1, m is a number of 2 or greater, and each of n1 and n3 independently represents a number of 0 or greater. The m occurrences of n2 may be the same or different, and each independently represents a number of 0 or greater. The total of n1, the m occurrences of n2, and n3 represents the number of added moles of ethylene oxide in the polyoxyethylene polyglyceryl ether, and is described below in further detail.

The cellulose molecules in paper are bound together by hydrogen bonding, but when the paper absorbs the water in an ink, the water may penetrate the hydrogen bonds between the cellulose molecules near the surface of the paper to which the ink has been applied, resulting in cleavage of the hydrogen bonds between the cellulose molecules. As a result, the surface of the paper to which the ink has been applied may swell, and therefore immediately after application of the ink, a minus curl may be formed, with the ink application surface becoming a convex surface. Subsequently, as the water evaporates, new hydrogen bonds may form between the cellulose molecules in different locations from those prior to the hydrogen bond cleavage, and the paper shifts from a minus curl state to a plus curl state in which the ink application surface forms a concave surface with the ends of the paper lifted upward. If evaporation of the water proceeds rapidly, then this plus curl phenomenon tends to be quite marked.

Water-soluble organic solvents having two or more hydroxyl groups at the terminals (such as glycerol and triethylene glycol) can act in a similar manner to water, penetrating the hydrogen bonds between cellulose molecules and causing cleavage of the hydrogen bonds between cellulose molecules. The polyoxyethylene polyglyceryl ether P also has two or more hydroxyl groups at the terminals. However, in the polyoxyethylene polyglyceryl ether P, the ratio (B/A) of the total number (B) of hydroxyl groups within the molecule relative to the weight average molecular weight (A) is within a range from 0.002 to 0.012, and therefore compared with glycerol and the like, the number of hydroxyl groups relative to the molecular weight is small. As a result, it is thought that the polyoxyethylene polyglyceryl ether P is comparatively less likely to penetrate between cellulose molecules, and even if penetration between cellulose molecules does occur, is less likely to contribute to swelling of the paper, thus enabling a reduction in paper deformation.

In recent years, the release into the atmosphere of volatile organic compounds (hereafter sometimes abbreviated as VOC), which are organic compounds that exhibit volatility and become gaseous in the open atmosphere, is causing various problems, including pollution which may cause health concerns and the like. Although high-speed printing enables multiple printed items to be output in a short period of time, the amount of VOC emissions tends to increase.

When the polyoxyethylene polyglyceryl ether P is used, the amount of VOC emissions may be reduced.

In solvents, the larger the molecular weight, or the larger the intermolecular forces, the less likely the solvent is to volatilize. The polyoxyethylene polyglyceryl ether P has at least three hydroxyl groups (OH groups) within the molecule, and therefore hydrogen bonding can occur readily between molecules. Because the ratio (B/A) of the total number (B) of hydroxyl groups within the molecule relative to the weight average molecular weight (A) is from 0.002 to 0.012, the molecular weight is also large. It is thought that because of the actions of these intermolecular forces and the size of the molecular weight, the volatility of the polyoxyethylene polyglyceryl ether P may be suppressed.

Further, in those cases where a printed item prepared using an aqueous ink is brought into contact with a toner printed item, the two printed items may sometimes stick together. When the polyoxyethylene polyglyceryl ether P is used, adhesion of the obtained printed item to printed items prepared using a toner may also be suppressed. It is thought that this adhesion between aqueous ink printed items and toner printed items occurs as a result of the water-soluble solvent contained in the aqueous ink dissolving the resin of the toner. Further, it is also thought that solvents having a comparatively low polarity and a comparatively small molecular weight are more likely to dissolve toner resins. Because the polyoxyethylene polyglyceryl ether P has a comparatively high polarity and a large molecular weight, it is thought to be less likely to dissolve the resins of toners, meaning that when the polyoxyethylene polyglyceryl ether P is used, adhesion between the resulting printed items and toner printed items may be suppressed.

In the polyoxyethylene polyglyceryl ether P, the ratio (B/A) of the total number (B) of hydroxyl groups within the molecule relative to the weight average molecular weight (A) is preferably at least 0.002, and may be 0.003 or greater. Further, the ratio (B/A) of the total number (B) of hydroxyl groups within the molecule relative to the weight average molecular weight (A) is preferably not more than 0.012, more preferably not more than 0.010, and even more preferably 0.009 or less.

From the viewpoint of further reducing paper deformation, the number of added moles of ethylene oxide in the polyoxyethylene polyglyceryl ether P is preferably at least 3, more preferably at least 4, even more preferably at least 6, even more preferably at least 8, and even more preferably 10 or greater. As the number of added moles of ethylene oxide increases, the ink viscosity tends to increase. As the ink viscosity increases, the amount of power required to heat the ink to adjust the viscosity to a level appropriate for the head also tends to increase. Accordingly, from the viewpoint of power consumption, the number of added moles of ethylene oxide is preferably not more than 65, more preferably not more than 35, even more preferably not more than 30, and even more preferably 25 or less.

The number of added moles of ethylene oxide in the polyoxyethylene polyglyceryl ether P is the average value of the number of moles of ethylene oxide units added to 1 mol of the polyglycerol. For example, using formula P1 as an example, the total of n1, the m occurrences of n2, and n3 represents the number of moles of ethylene oxide in the polyoxyethylene polyglyceryl ether of formula P1.

In the polyoxyethylene polyglyceryl ether P, the total number (B) of hydroxyl groups (OH groups) within the molecule is at least 3, but is preferably 4 or greater. In the polyoxyethylene polyglyceryl ether P, the total number (B) of hydroxyl groups (OH groups) within the molecule is preferably not more than 6.

In the polyoxyethylene polyglyceryl ether P, the glycerol polymerization degree is at least 2, and is preferably within a range from 2 to 5, and more preferably from 2 to 3.

From the viewpoint of further reducing paper deformation, the weight average molecular weight of the polyoxyethylene polyglyceryl ether P is preferably at least 200, more preferably at least 400, and even more preferably 600 or greater.

As the number of added moles of ethylene oxide increases, the ink viscosity tends to increase. As the ink viscosity increases, the amount of power required to heat the ink to adjust the viscosity to a level appropriate for the head also increases. Accordingly, from the viewpoint of power consumption, the weight average molecular weight of the polyoxyethylene polyglyceryl ether P is preferably not more than 5,000, more preferably not more than 3,000, and even more preferably 2,000 or less.

The weight average molecular weight is the polystyrene-equivalent value obtained using GPC (gel permeation chromatography).

Preferable examples of the polyoxyethylene polyglyceryl ether P includes a compound represented by formula P2 shown below. In the following formula P2, each of x, y, z and w independently represents a number of 0 or greater, but the total of x, y, z and w, namely the number of added moles of ethylene oxide, is preferably at least 3, more preferably at least 6, even more preferably at least 8, even more preferably at least 10, and even more preferably 15 or greater. The total of x, y, z and w is preferably not more than 65, more preferably not more than 35, even more preferably not more than 30, and even more preferably 25 or less.

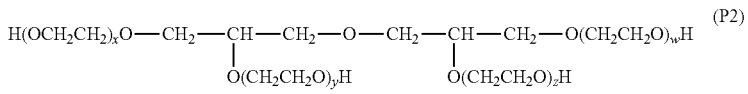
(P2)

A single type of polyoxyethylene polyglyceryl ether P may be used alone, or a combination of two or more types may be used.

There are no particular limitations on the amount of the polyoxyethylene polyglyceryl ether P within the ink.

The amount of the polyoxyethylene polyglyceryl ether P, relative to the total mass of the ink, is preferably at least 10% by mass, more preferably at least 15% by mass, and even more preferably 20% by mass or greater. In a case where the amount is within this range, the amount of curling (degree of curling) following drying may tend to be further reduced.

Further, the amount of the polyoxyethylene polyglyceryl ether P, relative to the total mass of the ink, is preferably not more than 40% by mass, and more preferably 35% by mass or less. In a case where the amount is within this range, minus curling is less likely to be maintained.

The mass ratio (D/C) of the amount (D) of the polyoxyethylene polyglyceryl ether P relative to the amount (C) of water in the ink is preferably within a range from 0.25 to 0.55. In a case where this ratio is not more than 0.55, minus curling may be even less likely to be maintained, and in a case where the ratio is at least 0.25, plus curling following drying may be even better suppressed, meaning the amount of curling can be reduced.

The ratio (B/A) of the total number (B) of hydroxyl groups within a molecule of the polyoxyethylene polyglyceryl ether P relative to the weight average molecular weight (A) of the polyoxyethylene polyglyceryl ether P, and the mass ratio (D/C) of the amount (D) of the polyoxyethylene polyglyceryl ether relative to the amount (C) of water preferably satisfy formula (1) shown below.

$$(B/A) \times (D/C) \leq 0.005 \tag{1}$$

When formula (1) is satisfied, namely when $(B/A) \times (D/C)$ is 0.005 or less, curling can be more easily reduced. The value of $(B/A) \times (D/C)$ is more preferably 0.004 or less, and even more preferably 0.003 or less.

Water having few impurities may be suitable as the water, and the use of a pure water such as ion-exchanged water or distilled water, or an ultrapure water is preferred.

The amount of water in the ink is preferably at least 50% by mass, more preferably at least 55% by mass, even more preferably at least 60% by mass, and even more preferably 65% by mass or greater. The amount of water in the ink is preferably not more than 80% by mass, and more preferably 75% by mass or less.

For the colorant, any one selected from the group consisting of pigments and dyes may be used singly, or two or more selected from the group consisting of pigments and dyes may be used in combination.

Specific examples of pigments that may be used include organic pigments such as azo-based pigments, phthalocyanine-based pigments, dye-based pigments, condensed polycyclic pigments, nitro-based pigments and nitroso-based pigments (such as brilliant carmine 6B, lake red C, Watchung red, disazo yellow, Hansa yellow, phthalocyanine blue, phthalocyanine green, alkali blue and aniline black); inorganic pigments, examples thereof including metals such as cobalt, iron, chromium, copper, zinc, lead, titanium, vanadium, manganese and nickel, as well as metal oxides and sulfides, and yellow ocher, ultramarine and iron blue pigments; and carbon blacks such as furnace carbon black, lamp black, acetylene black and channel black.

When the ink contains a pigment, a pigment dispersant may be added to enable stable dispersion of the pigment within the ink. Examples of the pigment dispersant include activators such as higher fatty acid salts, alkyl sulfates, alkyl ester sulfates, alkyl sulfonates, sulfosuccinates, naphthalene sulfonates, alkyl phosphates, polyoxyalkylene alkyl ether phosphates, polyoxyalkylene alkyl phenyl ethers, polyoxyethylene polyoxypropylene glycols, glycerol esters, sorbitan esters, polyoxyethylene fatty acid amides and amine oxides, as well as block copolymers and random copolymers formed from two or more monomers selected from among styrene, styrene derivatives, vinylnaphthalene derivatives, acrylic acid, acrylic acid derivatives, maleic acid, maleic acid derivatives, itaconic acid, itaconic acid derivatives, fumaric acid and fumaric acid derivatives, and salts of these copolymers.

Self-dispersing pigments may be used as the pigment. The self-dispersing pigment is preferably a pigment in which a hydrophilic functional group having ionicity has been introduced at the pigment surface. By anionically or cationically charging the pigment surface, the pigment particles can be stably dispersed in water by electrostatic repulsion. Examples of preferred anionic functional groups include a sulfonate group, carboxyl group, carbonyl group, hydroxyl group, phosphonate group or phosphate group. Examples of preferred cationic functional groups include quaternary ammonium groups and quaternary phosphonium groups. Among these functional groups, an anionic group such as a carboxyl group, hydroxyl group or phosphate group is particularly preferred.

These hydrophilic functional groups may be bonded directly to the pigment surface, or bonded via another group of atoms. Examples of this other group of atoms include alkylene groups, a phenylene group and a naphthylene group, but this is not an exhaustive list. Examples of the method used for treating the pigment surface include a diazotization treatment, sulfonation treatment, hypochlorous acid treatment, humic acid treatment, and vacuum plasma treatment.

Examples of commercially available self-dispersing pigments include the products CAB-O-JET 300 and CAB-O-JET 400 manufactured by Cabot Corporation, the products BONJET BLACK CW-1, BONJET BLACK CW-1S and BONJET BLACK CW-2 manufactured by Orient Chemical Industries, Ltd., and the product Aqua-Black 162 manufactured by Tokai Carbon Co., Ltd.

Examples of dyes include basic dyes, acid dyes, direct dyes, soluble vat dyes, acid mordant dyes, mordant dyes, reactive dyes, vat dyes and sulfide dyes. Among these, water-soluble dyes are preferred. More specific examples of the dyes include azo dyes, methine dyes, azomethine dyes, xanthene dyes, quinone dyes, phthalocyanine dyes, triphenylmethane dyes and diphenylmethane dyes.

These pigments and dyes may be used individually, or an appropriate combination of colorants may be used.

The amount of the colorant (namely, the colorant solid fraction) in the ink is preferably within a range from about 0.1 to 25% by mass, more preferably from 1 to 20% by mass, even more preferably from 3 to 15% by mass, and even more preferably from 5 to 15% by mass.

In addition to the polyoxyethylene polyglyceryl ether P, one or more other water-soluble organic solvents may also be added to the ink, provided they do not impair the effects of the present invention. These other water-soluble organic solvents may be selected appropriately from organic compounds that are liquid at room temperature and soluble in water.

The amount of the polyoxyethylene polyglyceryl ether P in the ink, relative to the total mass of all the water-soluble organic solvent in the ink, is preferably at least 50% by mass and more preferably 80% by mass or greater, and may be, for example, 100% by mass.

If necessary, the ink may also include one or more of the various additives typically used in the technical field, provided addition of these additives does not impair the object of the present invention.

Specifically, any one or more of an anionic surfactants, a cationic surfactant, an amphoteric surfactant or a nonionic surfactant may be added to the ink as a pigment dispersant, an antifoaming agent, a surface tension reducer or the like. Any one or more of a polymer-based surfactant, a silicone-based surfactant or a fluorine-based surfactant may be added to the ink as a pigment dispersant, an antifoaming agent, a surface tension reducer or the like.

There are no particular limitations on the surfactants, and preferable examples of the surfactant include acetylene glycol-based surfactants, polyoxyethylene alkyl phenols, polyoxyethylene alkyl ethers, and polyoxyethylene fatty acid esters and the like. Specific examples of acetylene glycol-based surfactants include Surfynol 465 and Surfynol 104 (manufactured by Air Products and Chemicals, Inc.), and OLFINE STG and OLFINE E1010 (manufactured by Nissin Chemical Industry Co., Ltd.).

An electrolyte may be added to the ink to adjust the ink viscosity. Examples of the electrolyte include sodium sulfate, potassium hydrogen phosphate, sodium citrate, potassium tartrate and sodium borate. One of these compounds may be used singly. Two or more of these compounds may be used in combination.

A conventional pH modifier may be added to adjust the pH of the ink. Examples of a compound which may be used as a pH modifier or as an ink thickening assistant include sulfuric acid, nitric acid, acetic acid, sodium hydroxide, potassium hydroxide, ammonium hydroxide and triethanolamine.

By adding an antioxidant, oxidation of the ink components can be prevented, and the storage stability of the ink can be improved. Examples of antioxidants that may be used include L-ascorbic acid, sodium L-ascorbate, sodium isoascorbate, potassium sulfite, sodium sulfite, sodium thiosulfate, sodium dithionite and sodium pyrosulfite.

By adding a preservative, decomposition of the ink can be prevented, and the storage stability can be improved. Examples of preservatives that may be used include isothiazolone-based preservatives such as 5-chloro-2-methyl-4-isothiazolin-3-one, 2-methyl-4-isothiazolin-3-one, 2-n-octyl-4-isothiazolin-3-one and 1,2-benzisothiazolin-3-one; triazine-based preservatives such as hexahydro-1,3,5-tris(2-hydroxyethyl)-s-triazine; pyridine-based or quinoline-based preservatives such as sodium 2-pyridinethiol 1-oxide and 8-oxyquinoline; dithiocarbamate-based preservatives such as sodium dimethyldithiocarbamate; organobromine-based preservatives such as 2,2-dibromo-3-nitrilopropionamide, 2-bromo-2-nitro-1,3-propanediol, 2,2-dibromo-2-nitroethanol and 1,2-dibromo-2,4-dicyanobutane; as well as methyl p-hydroxybenzoate, ethyl p-hydroxybenzoate, potassium sorbate, sodium dehydroacetate and salicylic acid.

The ink according to the present embodiment can be prepared by mixing the various components, either in a single batch or in portions, and then, if necessary, dispersing the resulting mixture using an appropriate dispersion device.

The suitable range for the viscosity of the ink may vary depending on factors such as the diameter of the nozzles in the discharge head and the discharge environment, but generally, the viscosity at 23° C. is preferably within a range from 1 to 30 mPa·s, and a viscosity at 23° C. of 1 to 10 mPa·s is suitable for use in inkjet recording devices. This viscosity represents the value at 10 Pa when the shear stress is increased from 0 Pa at a rate of 0.1 Pa/s at a temperature of 23° C.

The ink according to the present embodiment can be applied to a recording medium using an inkjet recording method to produce a printed item. The inkjet recording method may employ any of various systems, examples of which including a thermal inkjet system, a piezo inkjet system and an electrostatic inkjet system. The ink according to the present embodiment may be, for example, discharged from an inkjet head based on a digital signal, and the discharged ink droplets may be then adhered to the recording medium.

There are no particular limitations on the recording medium, and examples of media that may be used include plain papers, woody papers, high-quality plain papers, inkjet (IJ) papers, IJ matte papers, coated papers prepared by coating a recording medium with an ink-absorbing solution, fine coated papers having a thinner ink-absorbing layer than coated papers, glossy papers (photo glossy papers), specialty papers and fabrics.

By using the ink of the present embodiment, paper deformation such as curling can be reduced, and therefore the paper transport properties can be improved, enabling the ink to also be applied to high-speed printing. As a result, the ink according to the present embodiment can be used favorably in line head-type inkjet printers.

EXAMPLES

The present invention is described below in further detail based on a series of examples, but the present invention is in no way limited by these examples.

<Preparation of Inks>

Formulations of inks of examples and comparative examples are shown in Tables 1 to 4. The raw materials shown in Tables 1 to 4 were mixed in the proportions shown in the tables to obtain mixtures totaling 100 g, and each mixture was then stirred for 10 minutes at a rotational rate of 50 rpm using an AS ONE Mix Rotor VMR-5R. Following stirring, each mixture was filtered through a membrane filter having a pore size of 0.8 µm, thus obtaining inks of Examples 1 to 12 and Comparative Examples 1 to 4.

The amount of the "pigment dispersion" shown in Tables 1 to 4 indicates the amount of the pigment dispersion (CW-2 or COJ300) shown in the table. Further, in Tables 1 to 4, the amount of the pigment (solid fraction) in the ink is also shown as the "amount (solid fraction) of colorant in the ink", and the total amount of water in the ink including the water in the pigment dispersion is shown as the "amount of water in the ink".

The raw materials used are listed below.

1. Pigment Dispersions and Dye
   CW-2: a self-dispersing carbon black dispersion, BONJET BLACK CW-2, solid fraction: 15% by mass, manufactured by Orient Chemical Industries, Ltd.
   COJ300: a self-dispersing carbon black dispersion, CAB-O-JET 300, solid fraction: 14.9% by mass, manufactured by Cabot Corporation.
   Daiwa IJ Black 102H: a black dye, solid fraction: 100% by mass, manufactured by Daiwa Kasei Co., Ltd.
2. Water-Soluble Organic Solvents
   SC-E350: a polyglyceryl ether SC-E350, number of added moles of ethylene oxide (EO): approximately 4, number of hydroxyl groups (OH groups): 4, weight average molecular weight (Mw): 350, number of hydroxyl groups (OH groups)/weight average molecular weight (Mw): 0.0114, manufactured by Sakamoto Yakuhin Kogyo Co., Ltd.

SC-E750: a polyglyceryl ether SC-E750, number of added moles of ethylene oxide (EO): approximately 13, number of hydroxyl groups (OH groups): 4, weight average molecular weight (Mw): 750, number of hydroxyl groups (OH groups)/weight average molecular weight (Mw): 0.0053, manufactured by Sakamoto Yakuhin Kogyo Co., Ltd.

SC-E1000: a polyglyceryl ether SC-E1000, number of added moles of ethylene oxide (EO): approximately 20, number of hydroxyl groups (OH groups): 4, weight average molecular weight (Mw): 1,000, number of hydroxyl groups (OH groups)/weight average molecular weight (Mw): 0.0040, manufactured by Sakamoto Yakuhin Kogyo Co., Ltd.

SC-E1500: a polyglyceryl ether SC-E1500, number of added moles of ethylene oxide (EO): approximately 30, number of hydroxyl groups (OH groups): 4, weight average molecular weight (Mw): 1,500, number of hydroxyl groups (OH groups)/weight average molecular weight (Mw): 0.0027, manufactured by Sakamoto Yakuhin Kogyo Co., Ltd.

SC-P750: a polyglyceryl ether SC-P750, number of added moles of ethylene oxide (EO): 0, number of hydroxyl groups (OH groups): 4, weight average molecular weight (Mw): 750, number of hydroxyl groups (OH groups)/weight average molecular weight (Mw): 0.0053, manufactured by Sakamoto Yakuhin Kogyo Co., Ltd.

Triethylene glycol: number of hydroxyl groups (OH groups): 2, weight average molecular weight (Mw): 150, number of hydroxyl groups (OH groups)/weight average molecular weight (Mw): 0.0133, manufactured by Kanto Chemical Co., Inc.

Tetraethylene glycol: number of hydroxyl groups (OH groups): 2, weight average molecular weight (Mw): 194, number of hydroxyl groups (OH groups)/weight average molecular weight (Mw): 0.0103, manufactured by Kanto Chemical Co., Inc.

Diethylene glycol monobutyl ether: number of hydroxyl groups (OH groups): 1, weight average molecular weight (Mw): 162, number of hydroxyl groups (OH groups)/weight average molecular weight (Mw): 0.0062, manufactured by Wako Pure Chemical Industries, Ltd.

3. Surfactant

OLFINE E1010: an acetylene glycol-based surfactant, manufactured by Nissin Chemical Industry Co., Ltd.

4. Water

Ion-exchanged water

<Evaluations>

The inks of the examples and comparative examples were each subjected to the following evaluations. The results are shown in Tables 1 to 4.

1. Ink Viscosity

Following preparation, the viscosity of each ink was measured. The ink viscosity refers to the viscosity at 10 Pa when the shear stress was increased from 0 Pa at a rate of 0.1 Pa/s at a temperature of 23° C., and was measured using a Rheometer AR-G2, manufactured by TA Instruments, Inc. (cone angle: 2°, diameter 40 mm).

2. Paper Deformation

Using a plain paper (Riso Paper Light, manufactured by Riso Kagaku Corporation) or a woody paper (Tomazara, manufactured by Oji Holdings Corporation) that had been cut to dimensions of 50 mm×100 mm as the recording medium, a bar coater P0.08H4S (manufactured by OSG System Products Corporation) was used to apply each ink to the recording medium using the coating amount shown in Tables 1 to 4, thereby forming a borderless black solid image of 50 mm×100 mm.

The paper with the black solid image formed thereon was placed on a horizontal surface with the image formation surface facing upward, and the amount of paper deformation was measured 3 seconds after, and then 24 hours after, formation of the black solid image. For the paper laying on the horizontal surface with the image formation surface facing upward, the amount of paper deformation was measured as the maximum height from the horizontal surface of those portions of the paper lifted above the horizontal surface due to paper deformation. In the case of convex deformation where the image formation surface becomes a convex surface, the amount of deformation was measured as a minus value, whereas in the case of concave deformation where the image formation surface becomes a concave surface, the amount of deformation was measured as a plus value. The amount of paper deformation 3 seconds after image formation, and the amount of paper deformation 24 hours after image deformation were evaluated against the following criteria.

(1) Amount of deformation 3 seconds after (immediately after) image formation

A: −10 mm≤amount of deformation≤10 mm

B: −16 mm≤amount of deformation<−10 mm, or 10 mm<amount of deformation≤16 mm

C: amount of deformation<−16 mm, or 16 mm<amount of deformation (2) Amount of deformation 24 hours after image formation (after drying)

AA: −2 mm≤amount of deformation≤2 mm

A: −5 mm≤amount of deformation<−2 mm, or 2 mm<amount of deformation≤5 mm

B: −10 mm≤amount of deformation<−5 mm, or 5 mm<amount of deformation≤10 mm

C: amount of deformation<−10 mm, or 10 mm<amount of deformation

3. VOC

For each of the organic solvents used in the inks of the examples and comparative examples (namely, SC-E350, SC-E750, SC-E1000, SC-E1500, SC-P750, triethylene glycol, tetraethylene glycol, and diethylene glycol monobutyl ether), a gas chromatography analysis was performed using a TD-20 apparatus manufactured by Shimadzu Corporation, and a determination was made as to whether or not peaks could be detected within the region from n-hexane to n-hexadecane, which act as VOC indicators. The results revealed that, among these organic solvents, peaks were detected in the range from n-hexane to n-hexadecane for diethylene glycol monobutyl ether, but no peaks were detected in the range from n-hexane to n-hexadecane for the other organic solvents (SC-E350, SC-E750, SC-E1000, SC-E1500, SC-P750, triethylene glycol, and tetraethylene glycol).

The level of VOC was evaluated on the basis of whether or not an organic solvent was used for which peaks were detected in the range from n-hexane to n-hexadecane. Inks that did not use an organic solvent for which peaks were detected in the range from n-hexane to n-hexadecane were awarded an evaluation of A, whereas inks that used an organic solvent for which peaks were detected in the range from n-hexane to n-hexadecane were awarded an evaluation of C.

4. Adhesion to Toner Printed Item

Using Fuji Xerox ApeosPort C3626 special toner (manufactured by Fuji Xerox Co., Ltd.) (a styrene/acrylic resin toner), a black solid image with a white border of 20 mm was formed on an A4-size sheet of Riso Paper Light using a Fuji Xerox ApeosPort C3626 apparatus (manufactured by Fuji Xerox Co., Ltd.). Subsequently, 0.2 g of the ink of the example or comparative example was dripped onto the printed image, and a white sheet of A4-size Riso Paper Light was then overlaid on top of the printed image and left to stand for one week in an environment at 23° C. and 50% RH. After this standing period, if no adhesion of the ApeosPort C3626 toner to the overlaid Riso Paper Light was noticeable, an evaluation of A was awarded, whereas if adhesion was confirmed, an evaluation of C was awarded.

TABLE 1

| | (% by mass) | EO number | OH number (B) | Mw (A) | OH number/Mw (B/A) | Example 1 | Example 2 | Example 3 | Example 4 | Example 5 |
|---|---|---|---|---|---|---|---|---|---|---|
| Water-soluble organic solvent | SC-E350 | 4 | 4 | 350 | 0.0114 | 26.8 | 20.8 | | | |
| | SC-E750 | 13 | 4 | 750 | 0.0053 | | | 26.8 | | |
| | SC-E1000 | 20 | 4 | 1000 | 0.0040 | | | | 26.8 | |
| | SC-E1500 | 30 | 4 | 1500 | 0.0027 | | | | | 26.8 |
| | SC-P750 | 0 | 4 | 750 | 0.0053 | | | | | |
| | triethylene glycol | | 2 | 150 | 0.0133 | | | | | |
| | tetraethylene glycol | | 2 | 194 | 0.0103 | | | | | |
| | diethylene glycol monobutyl ether | | 1 | 162 | 0.0062 | | | | | |
| Pigment dispersion | CW-2 (solid fraction: 15% by mass) | | | | | 53.3 | 40.0 | 53.3 | 53.3 | 53.3 |
| | COJ300 (solid fraction: 14.9% by mass) | | | | | | | | | |
| Surfactant | OLFINE E1010 | | | | | 0.2 | 0.2 | 0.2 | 0.2 | 0.2 |
| Water | Ion-exchanged water | | | | | 19.7 | 39.0 | 19.7 | 19.7 | 19.7 |
| | Total (% by mass) | | | | | 100.0 | 100.0 | 100.0 | 100.0 | 100.0 |
| | Water-soluble organic solvent/water (D/C) (mass ratio) | | | | | 0.41 | 0.28 | 0.41 | 0.41 | 0.41 |
| | [OH number/Mw (B/A)] × [water-soluble organic solvent/water (D/C)] | | | | | 0.0047 | 0.0032 | 0.0022 | 0.0016 | 0.0011 |
| | Amount of water in ink (% by mass) | | | | | 65.0 | 73.0 | 65.0 | 65.0 | 65.0 |
| | Amount of colorant (solid fraction) in ink (% by mass) | | | | | 8.0 | 6.0 | 8.0 | 8.0 | 8.0 |
| | Ink viscosity (23° C., mPa·s) | | | | | 5.3 | 3.9 | 6.8 | 7.9 | 9.5 |
| Paper deformation | Paper type | | | | | plain paper | plain paper | plain paper | plain paper | plain paper |
| | Ink coating amount (g/m²) | | | | | 8 | 7 | 8 | 9 | 8 |
| | After 3 seconds (immediate curl) | | | | | B | B | B | B | B |
| | After 24 hours (curl after drying) | | | | | B | A | A | AA | AA |
| | VOC | | | | | A | A | A | A | A |
| | Adhesion to toner printed item | | | | | A | A | A | A | A |

TABLE 2

| | (% by mass) | EO number | OH number (B) | Mw (A) | OH number/Mw (B/A) | Example 6 | Example 7 | Example 8 | Example 9 |
|---|---|---|---|---|---|---|---|---|---|
| Water-soluble organic solvent | SC-E350 | 4 | 4 | 350 | 0.0114 | | | | |
| | SC-E750 | 13 | 4 | 750 | 0.0053 | 31.8 | 31.8 | 21.8 | 20.8 |
| | SC-E1000 | 20 | 4 | 1000 | 0.0040 | | | | |
| | SC-E1500 | 30 | 4 | 1500 | 0.0027 | | | | |
| | SC-P750 | 0 | 4 | 750 | 0.0053 | | | | |
| | triethylene glycol | | 2 | 150 | 0.0133 | | | | |
| | tetraethylene glycol | | 2 | 194 | 0.0103 | | | | |
| | diethylene glycol monobutyl ether | | 1 | 162 | 0.0062 | | | | |
| Pigment dispersion | CW-2 (solid fraction: 15% by mass) | | | | | | 53.3 | | 40.0 |
| | COJ300 (solid fraction: 14.9% by mass) | | | | | 53.8 | | 53.8 | |
| Dye | Daiwa IJ Black 102H (solid fraction: 100% by mass) | | | | | | | | |
| Surfactant | OLFINE E1010 | | | | | 0.2 | 0.2 | 0.2 | 0.2 |
| Water | Ion-exchanged water | | | | | 14.2 | 14.7 | 24.2 | 39.0 |
| | Total (% by mass) | | | | | 100.0 | 100.0 | 100.0 | 100.0 |
| | Water-soluble organic solvent/water (D/C) (mass ratio) | | | | | 0.53 | 0.53 | 0.31 | 0.28 |
| | [OH number/Mw (B/A)] × [water-soluble organic solvent/water (D/C)] | | | | | 0.0028 | 0.0028 | 0.0016 | 0.0015 |
| | Amount of water in ink (% by mass) | | | | | 60.0 | 60.0 | 70.0 | 73.0 |
| | Amount of colorant (solid fraction) in ink (% by mass) | | | | | 8.0 | 8.0 | 8.0 | 6.0 |
| | Ink viscosity (23° C., mPa·s) | | | | | 9.7 | 9.2 | 5.4 | 4.3 |
| Paper deformation | Paper type | | | | | plain paper | plain paper | plain paper | plain paper |
| | Ink coating amount (g/m²) | | | | | 9 | 9 | 8 | 8 |
| | After 3 seconds (immediate curl) | | | | | A | B | B | B |
| | After 24 hours (curl after drying) | | | | | A | B | AA | AA |
| | VOC | | | | | A | A | A | A |
| | Adhesion to toner printed item | | | | | A | A | A | A |

TABLE 3

| (% by mass) | | EO number | OH number (B) | Mw (A) | OH number/Mw (B/A) | Example 10 | Example 11 | Example 12 |
|---|---|---|---|---|---|---|---|---|
| Water-soluble organic solvent | SC-E350 | 4 | 4 | 350 | 0.0114 | | | |
| | SC-E750 | 13 | 4 | 750 | 0.0053 | | 26.8 | 26.8 |
| | SC-E1000 | 20 | 4 | 1000 | 0.0040 | 26.8 | | |
| | SC-E1500 | 30 | 4 | 1500 | 0.0027 | | | |
| | SC-P750 | 0 | 4 | 750 | 0.0053 | | | |
| | triethylene glycol | | 2 | 150 | 0.0133 | | | |
| | tetraethylene glycol | | 2 | 194 | 0.0103 | | | |
| | diethylene glycol monobutyl ether | | 1 | 162 | 0.0062 | | | |
| Pigment dispersion | CW-2 (solid fraction: 15% by mass) | | | | | 53.3 | 53.3 | |
| | COJ300 (solid fraction: 14.9% by mass) | | | | | | | |
| Dye | Daiwa IJ Black 102H (solid fraction: 100% by mass) | | | | | | | 8.0 |
| Surfactant | OLFINE E1010 | | | | | 0.2 | 0.2 | 0.2 |
| Water | Ion-exchanged water | | | | | 19.7 | 19.7 | 65.0 |
| Total (% by mass) | | | | | | 100.0 | 100.0 | 100.0 |
| Water-soluble organic solvent/water (D/C) (mass ratio) | | | | | | 0.41 | 0.41 | 0.41 |
| [OH number/Mw (B/A)] × [water-soluble organic solvent/water (D/C)] | | | | | | 0.0016 | 0.0022 | 0.0022 |
| Amount of water in ink (% by mass) | | | | | | 65.0 | 65.0 | 65.0 |
| Amount of colorant (solid fraction) in ink (% by mass) | | | | | | 8.0 | 8.0 | 8.0 |
| Ink viscosity (23° C., mPa · s) | | | | | | 7.9 | 6.8 | 6.9 |
| Paper deformation | Paper type | | | | | woody paper | woody paper | plain paper |
| | Ink coating amount (g/m²) | | | | | 9 | 9 | 9 |
| | After 3 seconds (immediate curl) | | | | | A | A | B |
| | After 24 hours (curl after drying) | | | | | AA | AA | A |
| VOC | | | | | | A | A | A |
| Adhesion to toner printed item | | | | | | A | A | A |

TABLE 4

| (% by mass) | | EO number | OH number (B) | Mw (A) | OH number/Mw (B/A) | Comparative Example 1 | Comparative Example 2 | Comparative Example 3 | Comparative Example 4 |
|---|---|---|---|---|---|---|---|---|---|
| Water-soluble organic solvent | SC-E350 | 4 | 4 | 350 | 0.0114 | | | | |
| | SC-E750 | 13 | 4 | 750 | 0.0053 | | | | |
| | SC-E1000 | 20 | 4 | 1000 | 0.0040 | | | | |
| | SC-E1500 | 30 | 4 | 1500 | 0.0027 | | | | |
| | SC-P750 | 0 | 4 | 750 | 0.0053 | | | | 26.8 |
| | triethylene glycol | | 2 | 150 | 0.0133 | 26.8 | | | |
| | tetraethylene glycol | | 2 | 194 | 0.0103 | | 31.8 | | |
| | diethylene glycol monobutyl ether | | 1 | 162 | 0.0062 | | | 26.8 | |
| Pigment dispersion | CW-2 (solid fraction: 15% by mass) | | | | | 53.3 | 53.3 | 53.3 | 53.3 |
| | COJ300 (solid fraction: 14.9% by mass) | | | | | | | | |
| Surfactant | OLFINE E1010 | | | | | 0.2 | 0.2 | 0.2 | 0.2 |
| Water | Ion-exchanged water | | | | | 19.7 | 14.7 | 19.7 | 19.7 |
| Total (% by mass) | | | | | | 100.0 | 100.0 | 100.0 | 100.0 |
| Water-soluble organic solvent/water (D/C) (mass ratio) | | | | | | 0.41 | 0.53 | 0.41 | 0.41 |
| [OH number/Mw (B/A)] × [water-soluble organic solvent/water (D/C)] | | | | | | 0.0055 | 0.0055 | 0.0025 | 0.0022 |
| Amount of water in ink (% by mass) | | | | | | 65.0 | 60.0 | 65.0 | 65.0 |
| Amount of colorant (solid fraction) in ink (% by mass) | | | | | | 8.0 | 8.0 | 8.0 | 8.0 |
| Ink viscosity (23° C., mPa · s) | | | | | | 4.1 | 5.6 | 4.4 | 7.1 |
| Paper deformation | Paper type | | | | | plain paper | plain paper | plain paper | plain paper |
| | Ink coating amount (g/m²) | | | | | 8 | 7 | 9 | 9 |
| | After 3 seconds (immediate curl) | | | | | C | B | C | C |
| | After 24 hours (curl after drying) | | | | | B | C | B | C |
| VOC | | | | | | A | A | C | A |
| Adhesion to toner printed item | | | | | | A | A | C | A |

In Examples 1 to 12, paper deformation was suppressed. Further, in Examples 1 to 12, adhesion to the toner printed item was also suppressed. Furthermore, as mentioned above, when the polyoxyethylene polyglyceryl ethers that were used in the inks of the examples and had a ratio (B/A) of the total number (B) of hydroxyl groups within the molecule relative to the weight average molecular weight (A) of 0.002 to 0.012 were subjected to gas chromatography analysis, no peaks were detected in the range from n-hexane to n-hexadecane.

In contrast, in Comparative Examples 1 and 2, which used triethylene glycol or tetraethylene glycol rather than a polyoxyethylene polyglyceryl ether which has a structure in which ethylene oxide is added to polyglycerol, the degree of paper deformation after 3 seconds and after 24 hours was large.

In Comparative Example 3 in which diethylene glycol monobutyl ether was used, the paper deformation after 3 seconds was large. Further, adhesion occurred to the toner printed item.

In Comparative Example 4, which used a polyglyceryl ether containing added propylene oxide rather than ethylene oxide, the degree of paper deformation after 3 seconds and after 24 hours was large. It is thought that since propylene oxide has a low hydrophilicity compared with ethylene oxide, propylene oxide has a greater permeation promotion effect, and a lower water-holding capacity. It is surmised that because permeation is promoted, the amount of curling 3 seconds after image formation increased, whereas because the water-holding capacity is low, plus curling tended to have been promoted after 24 hours (after drying) due to water evaporation, also resulting in a larger amount of curling. In Comparative Examples 3 and 4, the amount of paper deformation after 24 hours was a positive number, indicating significant plus curling.

According to an embodiment of the present invention, an aqueous inkjet ink can be provided that is capable of producing a printed item having reducing paper deformation.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. An aqueous inkjet ink comprising water, a water-soluble organic solvent comprising a polyoxyethylene polyglyceryl ether, and a colorant, wherein
a ratio (B/A) of a total number (B) of hydroxyl groups within a molecule of the polyoxyethylene polyglyceryl ether relative to a weight average molecular weight (A) of the polyoxyethylene polyglyceryl ether is within a range from 0.002 to 0.012,
the colorant comprises a pigment, and
an amount of the polyoxyethylene polyglyceryl ether is 80% by mass or greater relative to a total mass of the water-soluble organic solvent in the aqueous inkjet ink.

2. The aqueous inkjet ink according to claim 1, wherein a mass ratio (D/C) of an amount (D) of the polyoxyethylene polyglyceryl ether relative to an amount (C) of the water is within a range from 0.25 to 0.55.

3. The aqueous inkjet ink according to claim 1, wherein the ratio (B/A) of a total number (B) of hydroxyl groups within a molecule of the polyoxyethylene polyglyceryl ether relative to a weight average molecular weight (A) of the polyoxyethylene polyglyceryl ether, and a mass ratio (D/C) of an amount (D) of the polyoxyethylene polyglyceryl ether relative to an amount (C) of the water satisfy the following formula (1).

$$(B/A) \times (D/C) \leq 0.005 \tag{1}$$

4. The aqueous inkjet ink according to claim 1, wherein a number of added moles of ethylene oxide in the polyoxyethylene polyglyceryl ether is at least 3.

5. The aqueous inkjet ink according to claim 1, wherein a number of added moles of ethylene oxide in the polyoxyethylene polyglyceryl ether is from 10 to 30.

6. The aqueous inkjet ink according to claim 3, wherein a number of added moles of ethylene oxide in the polyoxyethylene polyglyceryl ether is from 10 to 30.

7. The aqueous inkjet ink according to claim 1, wherein the ratio (B/A) is within a range from 0.003 to 0.012.

8. A method for producing a printed item, the method comprising applying the aqueous inkjet ink according to claim 1 to a recording medium using an inkjet recording method.

9. The method according to claim 8, wherein in the aqueous inkjet ink, a mass ratio (D/C) of an amount (D) of the polyoxyethylene polyglyceryl ether relative to an amount (C) of the water is within a range from 0.25 to 0.55.

10. The method according to claim 8, wherein in the aqueous inkjet ink, the ratio (B/A) of a total number (B) of hydroxyl groups within a molecule of the polyoxyethylene polyglyceryl ether relative to a weight average molecular weight (A) of the polyoxyethylene polyglyceryl ether, and a mass ratio (D/C) of an amount (D) of the polyoxyethylene polyglyceryl ether relative to an amount (C) of the water satisfy the following formula (1).

$$(B/A) \times (D/C) \leq 0.005 \tag{1}$$

11. The method according to claim 8, wherein in the aqueous inkjet ink, a number of added moles of ethylene oxide in the polyoxyethylene polyglyceryl ether is at least 3.

12. The method according to claim 8, wherein in the aqueous inkjet ink, a number of added moles of ethylene oxide in the polyoxyethylene polyglyceryl ether is from 10 to 30.

13. The method according to claim 10, wherein in the aqueous inkjet ink, a number of added moles of ethylene oxide in the polyoxyethylene polyglyceryl ether is from 10 to 30.

14. The method according to claim 8, wherein in the aqueous inkjet ink, the ratio (B/A) is within a range from 0.003 to 0.012.

* * * * *